May 15, 1951  A. LOPEZ  2,552,682
DRIVING CONNECTION FOR WATCHMAKERS' LATHES
Filed April 17, 1950

Adrian Lopez
INVENTOR
BY CA Knowles.
ATTORNEYS.

UNITED STATES PATENT OFFICE 2,552,682

DRIVING CONNECTION FOR WATCHMAKERS' LATHES

Adrián Lopez, New Orleans, La.

Application April 17, 1950, Serial No. 156,320

2 Claims. (Cl. 64—6)

This invention relates to a driving connection or coupling for watchmakers' lathes, whereby power is transmitted from a power source such as an electric motor for driving the lathe spindle.

Conventionally, the spindle of a watchmakers' lathe is equipped with a set of pulleys around which pass belts that also pass around pulleys on the shaft of an electric motor. This arrangement has certain disadvantages, in that the belt drive results in a certain amount of vibration or whipping of the lathe spindle. For example, as a cutting tool carried by the lathe bites more and more deeply into a piece of wood, a braking action, which is definitely a factor to be considered even though perhaps minute, is set up on the driven pulley. As a result, one flight of the drive belt is caused to go slack while the opposite flight is simultaneously drawn more taut. As before noted, this condition is hardly noticeable to the casual observer, but the result is that on each occasion that the condition is caused to arise, a momentary vibration or whipping in the shaft or spindle of the lathe is set up, which is obviously undesirable when one is working upon fine or delicate watch or jewelry parts.

Vibration is additionally set up by reason of the fact that the motor naturally tends to vibrate upon its mount, transmitting vibration through the motor shaft, drive pulleys, and belt, to the driven pulleys and lathe spindle.

An important object of the present invention is to provide a particular type of drive coupling or connection between the power source and lathe spindle which will eliminate the objectionable conditions noted above, the coupling or connection of the present invention being such as to filter out all vibration at the coupling, so that the lathe spindle will be held true at all times.

Another important object is to provide a construction as described wherein the motor is linked to the lathe spindle in direct drive but nevertheless need not be mounted with the center of the motor shaft directly in line with the center of the lathe spindle.

Still another object is to provide a construction as stated wherein the lathe and motor are readily movable wherever desired, so as to provide a portable lathe construction, which has not heretofore been possible where the motor is fixedly mounted in position and drives the lathe from a belt and pulley connection.

Still another object is to provide a construction as stated which is adapted to lathes as presently manufactured without necessity of modification or variation of the lathe construction.

Still another object is to provide a coupling of the character described which can be manufactured at relatively low cost and will comprise a minimum of parts simply arranged in a manner whereby they will not readily get out of order.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1:
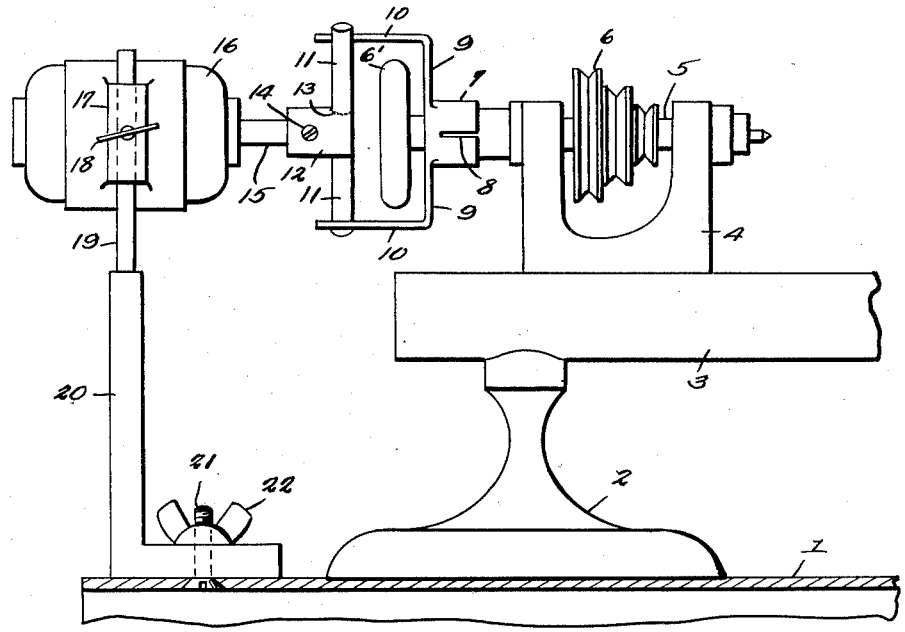
Fig. 1 is a side elevational view of the driving connection in place between a motor and the head portion of a lathe.
Figure 2:
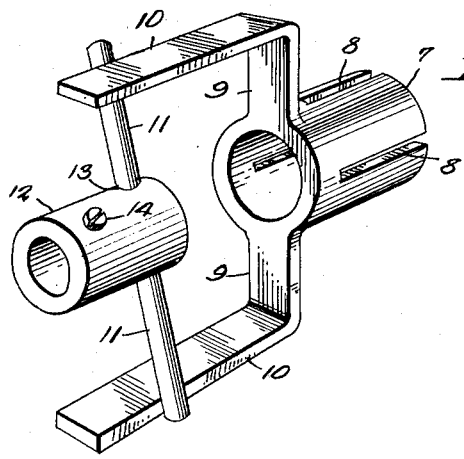
Fig. 2 is a perspective view on an enlarged scale of the driving connection.

Referring to the drawing in detail, on a bench 1 or other support is mounted the base 2 of a conventional watchmaker's lathe including the bed 3 on which is fixedly mounted the lathe head 4 in which is journaled the lathe spindle 5 conventionally equipped with the set of pulleys 6 whereby rotation is transmitted to the lathe spindle by means of belts, not shown. The present invention eliminates completely the necessity of the set of pulleys 6, but these pulleys are illustrated nevertheless because they are common equipment of all watchmakers' lathes as previously constructed to my knowledge, the invention being applicable to such lathes as now manufactured.

On the outer end of the lathe spindle is mounted the adjusting wheel 6' for manual locking or unlocking of the collar of the lathe head upon a selected tool.

In accordance with the present invention, I provide a sleeve 7 formed with the circumferential series of open ended longitudinal slots 8, said sleeve 7 being adapted to fit over the outer end portion of the lathe spindle 5. The sleeve 7 is a friction fit upon the lathe spindle and is otherwise free of connections with said lathe spindle, so that should the rotation of the lathe spindle be slowed up by the tool biting into the work, slippage of the sleeve 7 is permitted upon the spindle as necessary.

Integral or otherwise rigidly secured to diametrically opposite portions of the sleeve 7 are the radial arms 9 formed at their outer ends with the elongated laterally extending fingers 10.

Engaging the outer ends of the respective fingers 10 are the diametrically opposite drive pins 11 extending radially from a collar 12 and rigidly secured to said collar as by a weld 13 or other suitable means. By means of a set screw 14 the collar 12 is rigidly secured to the end of the motor shaft 15 for rotation by the shaft, said shaft 15 extending from the electric motor 16 mounted upon the slides 17 that carry the clamping bolts 18 whereby said slides are rigidly clamped in selected positions of vertical adjustment of the motor, to upstanding posts 19 that extend upwardly from a support 20 having the horizontal base at its bottom through which extends the screw 21 projecting upwardly from the bench 1, wing nut 22 being utilized to rigidly clamp said support 20 to the bench or other supporting surface.

From the drawings and from the description which has been provided herein, I believe it is apparent that the motor 16 can be mounted at any desired location, and the motor and lathe are both movable as necessary so as to make fully portable both the drive means and the lathe itself. In any event, assuming that the lathe has been positioned at a selected location, the motor 16 is mounted adjacent the head end of said lathe as in Fig. 1, the slides 17 being adjusted vertically on the standards 19 until the motor shaft 15 is in apparent axial alignment with the lathe spindle 5. The user, in this connection, need align the motor shaft and lathe spindle by no more than a visible check of their relative positions, and it is not necessary that they be aligned with complete exactness. Any variance or deviation from positions of true alignment is compensated for by the particular arrangement of drive pins 11 and fingers 10, since the drive pins will effectively and smoothly rotate the driven fingers 10 even though the motor shaft is eccentric to the driven lathe spindle.

It may be further noted that not only is the power source and lathe readily portable and quickly set up for use, but also, no vibration of the motor will be transmitted to the lathe during operation thereof, because there is no positive attachment linking the motor to the lathe spindle and tending to cause vibration of the lathe spindle responsive to motor vibration. Rather, the arrangement is one wherein simple pressure of the pin upon the finger of the driven portion is utilized for rotation of the lathe spindle.

Additionally, although the motor and lathe spindle are linked in direct drive, endwise movement of the motor shaft, which is common in electric motors, is nevertheless permitted without adversely affecting the driving linkage, the fingers 10 being of a length to permit said movement of the motor shaft.

Of further importance is the fact that the sleeve of the driven portion is a friction fit upon the lathe spindle. Thus, any braking action set up by biting of a tool into a piece of work does not have the ultimate result of causing vibration. In such a case the slotted frictionally fitted sleeve 7 continues to rotate at its previous speed at which it is driven by the pins 11, without setting up any vibration in the lathe spindle.

Yet another important characteristic of the invention is the fact that it is capable of manufacture at low cost and is mountable swiftly and easily upon a conventional watchmakers' lathe as now manufactured, without modification of said lathe in any way.

What is claimed is:

1. A drive coupling for watchmakers' lathes comprising a sleeve having a plurality of circumferentially spaced longitudinal slots, said sleeve adapted for a friction fit upon the end of a lathe spindle in a manner to be ordinarily rotatable with said spindle while yet being permitted slippage thereon; diametrically opposed radial arms rigid with said sleeve; laterally extending fingers rigid with the outer ends of said radial arms; a collar separably attachable to a drive shaft for rotation by said drive shaft; and a pair of diametrically opposed radial drive pins rigid with said collar and projecting across the path of said fingers for rotation of said sleeve responsive to rotation of the drive shaft.

2. A driving connection for watchmakers' lathes comprising a sleeve formed with a plurality of circumferentially spaced open ended longitudinal slots for frictionally fitting said sleeve upon a lathe spindle, thus to connect the sleeve and spindle for joint rotation while yet permitting relative slippage therebetween; a pair of diametrically opposed radial arms extending from and rigid with said sleeve; a pair of fingers rigid with the outer ends of said radial arms, said fingers being of substantial length and extending parallel to the axis of the sleeve and drive spindle; a collar adapted for attachment to the shaft of a driving motor for rotation by said motor; and a pair of diametrically opposed radial drive pins rigid with said collar and positioned with their free ends extending across the path of the free ends of said fingers.

ADRIÁN LOPEZ.

REFERENCES CITED

The following references are of record in the file of this patent:

UNITED STATES PATENTS

| Number | Name | Date |
| --- | --- | --- |
| 1,605,567 | Sexton | Nov. 2, 1926 |
| 2,355,087 | Lauder et al. | Aug. 8, 1944 |